C. SHERMUND & R. A. MALLETT.
AUTOMOBILE HEADLIGHT.
APPLICATION FILED NOV. 22, 1911.
1,026,709.
Patented May 21, 1912.
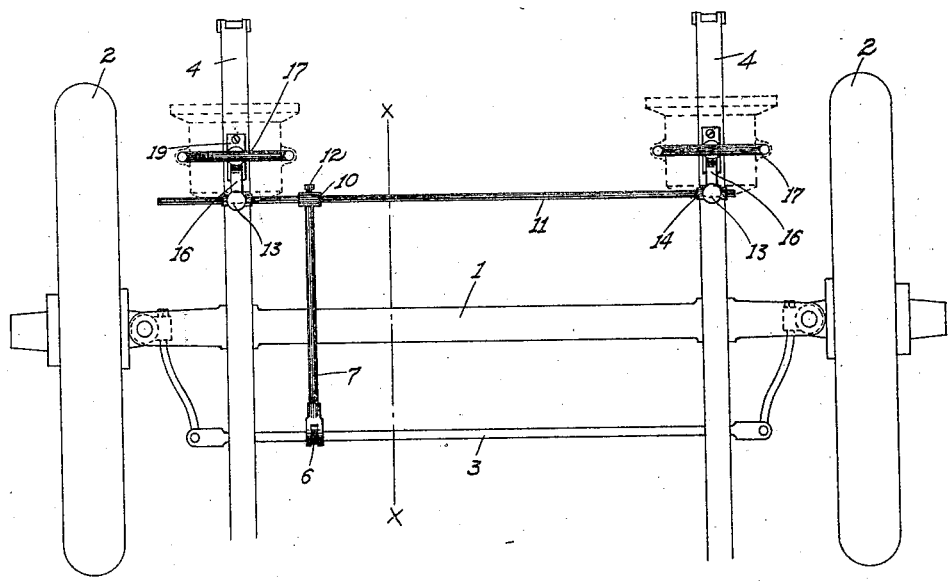
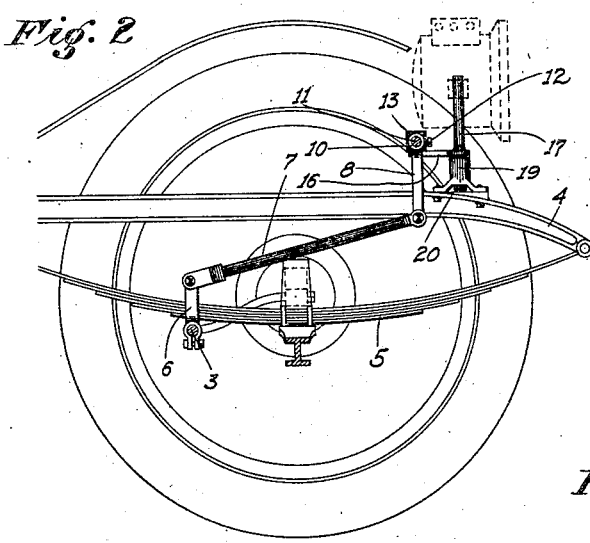
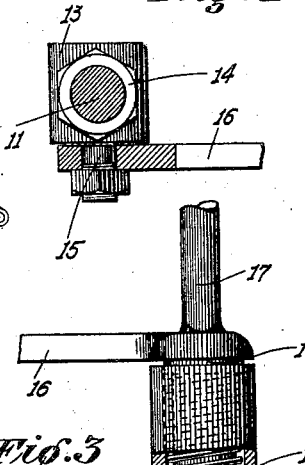
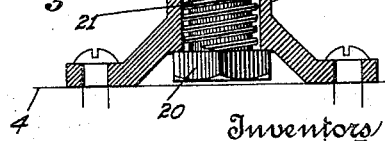
Witnesses
Inventors
C. Shermund
and R. A. Mallett

UNITED STATES PATENT OFFICE.

CONRAD SHERMUND AND RAYMOND ALFRED MALLETT, OF SACRAMENTO, CALIFORNIA.

AUTOMOBILE-HEADLIGHT.

1,026,709.   Specification of Letters Patent.   Patented May 21, 1912.

Application filed November 22, 1911. Serial No. 661,750.

*To all whom it may concern:*

Be it known that we, CONRAD SHERMUND and RAYMOND ALFRED MALLETT, citizens of the United States, residing at Sacramento, in the county of Sacramento, State of California, have invented certain new and useful Improvements in Automobile - Headlights; and we do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in headlights, and particularly to headlights for automobiles or other motor vehicles, the object of the invention being to produce a means whereby the headlights will turn in the same relative position as the front wheels turn, whereby the light will be thrown directly in front of the vehicle whether the same is going around curves or in a straightaway direction.

A further object of the invention is to produce a simple and inexpensive device, and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views.

Figure 1 is a top plan view of the front axle and wheels of an automobile showing our improved headlight supporting structure. Fig. 2 is a side elevation of the same. Fig. 3 is a side view partly in section of a lamp supporting bracket. Fig. 4 is a fragmentary view partly in section showing a flexible joint.

Referring now more particularly to the characters of reference on the drawings, 1 designates the front axle of the vehicle, and 2 the wheels thereon, and 3 the cross rod on the steering gear.

The numeral 4 designates the stationary supporting frame of the vehicle and 5 are the springs swung thereon.

In applying our improved structure we first clamp a vertical supporting bar 6 on the member 3 and hinge thereto a rod 7 hinged to the bar 8 having a collar 10 slidably mounted on a rod 11 and adapted to be fixed in any stationary position thereon by a set screw 12. This rod 11 projects through blocks 13 at each end and has adjusting nuts 14 to adjust it in any fixed position through said blocks. On the lower ends of said blocks 13 are pins 15 on which are turnably disposed bars 16 carrying on their outer ends upwardly projecting lamp supporting brackets 17 and having downwardly projecting pins 18 projecting into tubular members 19 bolted to the members 4, such pins 18 having nuts 20 on their lower ends bearing against the under sides of the tubular members 19, there being springs 21 interposed between the members 16 and the nuts 20, such members 16 being normally spaced a slight distance from the top of the tubular members 19. This last named structure permits the lights a slight movement vertically maintained in position by the springs 21, which structure prevents them from being jolted or broken by reason of the jolt or jar of the vehicle which might happen if the lights had no movement vertically with relation to the frames 4 after our turning structure was applied thereto.

As will readily be seen when the front wheels 2 are turned and the rod 3 moves across one way or the other, it will drive the bar 11 in the same direction which will turn the lights in the opposite direction to follow the direction taken by the wheels.

The joints between the members 7 and the bars 6 and 8 compensate for the vertical motion of the frame 4 occasioned by its movement upwardly or downwardly with the action of the springs 5.

The member 16 is turnable on the pins 15 to permit the lamps to be turned without breaking the parts while the rod 11 moves in a relatively straight position.

From the foregoing description it will readily appear that we have produced such a device as substantially fulfils the object of the invention as set forth herein.

While this specification sets forth in detail the present and preferred construction of the device, still in practice such deviations from such detail may be resorted to as do not form a departure from the spirit of the invention.

Having thus described our invention what we claim as new and useful and desire to secure by Letters Patent is:—

1. A device of the character described comprising a vehicle, lamps turnably mounted on the frame of said vehicle, bars connected with said lamps, blocks having pins projecting through said bars, a rod projected through said blocks and means connecting said rod and steering mechanism of said vehicle whereby said rod will be operated to turn said lamps in the direction taken by the forward wheels of said vehicle, as described.

2. A device of the character described comprising a vehicle having a cross steering rod, a vertical bar clamped to said steering rod, a rod hinged to said vertical bar at one end, another bar hinged to said rod at the other end, a collar on said last named bar, a rod projecting through said collar, two blocks spaced apart, said last named rod projecting through said blocks, pins on the lower ends of said blocks, bars turnably mounted on said pins and lamps turnably mounted on the frame of said vehicle and connected with said last named bars, as described.

In testimony whereof we affix our signatures in presence of two witnesses.

CONRAD SHERMUND.
RAYMOND ALFRED MALLETT.

Witnesses:
W. F. TAGGART,
C. E. LOOMIS.

Copies of this patent may be obtained for five cents each, by addressing the "Commissioner of Patents, Washington, D. C."